United States Patent
Davidson

(10) Patent No.: US 11,874,095 B2
(45) Date of Patent: Jan. 16, 2024

(54) IMPACT-ABSORBING FIBER-COMPOSITE STRUCTURES

(71) Applicant: Arris Composites Inc., Berkeley, CA (US)

(72) Inventor: Erick Davidson, Piedmont, CA (US)

(73) Assignee: ARRIS COMPOSITES INC., Berkeley, CA (US)

( * ) Notice: Subject to any disclaimer, the term of this patent is extended or adjusted under 35 U.S.C. 154(b) by 0 days.

(21) Appl. No.: 18/095,972

(22) Filed: Jan. 11, 2023

(65) Prior Publication Data

US 2023/0235994 A1 Jul. 27, 2023

Related U.S. Application Data

(60) Provisional application No. 63/303,796, filed on Jan. 27, 2022.

(51) Int. Cl.
| | |
|---|---|
| B32B 3/30 | (2006.01) |
| F41H 5/04 | (2006.01) |
| B32B 7/03 | (2019.01) |
| B32B 27/08 | (2006.01) |
| B32B 27/20 | (2006.01) |
| B32B 27/32 | (2006.01) |

(52) U.S. Cl.
CPC ............ F41H 5/0485 (2013.01); B32B 3/30 (2013.01); B32B 7/03 (2019.01); B32B 27/08 (2013.01); B32B 27/20 (2013.01); B32B 27/32 (2013.01); *B32B 2250/02* (2013.01); *B32B 2250/24* (2013.01); *B32B 2262/0253* (2013.01); *B32B 2262/0269* (2013.01); *B32B 2262/101* (2013.01); *B32B 2262/106* (2013.01); *B32B 2305/08* (2013.01); *B32B 2305/22* (2013.01); *B32B 2307/558* (2013.01); *F41H 5/04* (2013.01); *F41H 5/0478* (2013.01)

(58) Field of Classification Search
None
See application file for complete search history.

(56) References Cited

U.S. PATENT DOCUMENTS

2012/0180974 A1* 7/2012 Adams ................. F41H 5/0421
228/121

* cited by examiner

*Primary Examiner* — Alexander S Thomas
(74) *Attorney, Agent, or Firm* — Wayne S. Breyer; Kaplan, Breyer, Schwarz, LLP

(57) ABSTRACT

An impact-absorbing article includes two outer panels that sandwich a fiber-composite post-and-sheet layer. The post-and-sheet layer includes a plurality of fiber-composite "posts" that extend orthogonally with respect to a base.

19 Claims, 3 Drawing Sheets

IMPACT-ABSORBING FIBER-COMPOSITE STRUCTURES

STATEMENT OF RELATED CASES

This specification claims priority to U.S. 63/303,796 filed Jan. 27, 2022 and incorporated herein by reference.

FIELD OF THE INVENTION

The present invention pertains to fiber composites, and more particularly to impact-absorbing structures made therefrom.

BACKGROUND OF THE INVENTION

Body armor, usually in the form of a vest, is intended to provide ballistic protection to the vital organs of a wearer's torso. The vest typically includes two armor panels, which include a ballistics panel and a panel cover.

Body armor can be rigid/hard or soft. Soft armor is suitable for protection against small arms fire, such as handgun rounds. Soft armor is usually formed from multiple layers of ballistic fibers that are intended to absorb energy, and disperse it over a wide area. Historically, soft body armors included layers of woven fabrics that were stitched together. More recently, such armors feature a laminate structure comprising layers of nonwoven, unidirectional layers, and combinations of woven or nonwoven laminates. The fibers used in soft armor are typically ultra-high-molecular-weight polyethylene (UHMWPE) or aramid (Kevlar®).

SUMMARY

The present invention provides an impact-absorbing article, such as a ballistics panel for resistance against small-caliber projectiles. In the illustrative embodiment, the impact-absorbing article includes two outer panels that sandwich a fiber-composite post-and-sheet layer.

Unlike the weaves, etc., of the prior art, the post-and-sheet layer includes a plurality of fiber-composite "posts" that extend orthogonally with respect to a fiber-composite sheet or "base." In some embodiments, the base of the post-and-sheet layer includes a plurality of long fibers, which, in the illustrative embodiment, are randomly oriented in a thermoplastic resin matrix. Such a random fiber orientation is preferable in the base because this imbues it with transverse isotropic properties. Fracture paths through the sheet will therefore be relatively more tortuous than if the fiber orientation were aligned. This results in relatively greater energy absorption.

In some embodiments, some of the fibers from the base extend into the posts, and are oriented in the axial direction in the posts (i.e., align with the long axis of the post). Since, in the illustrative embodiment, the fibers are longer than the posts, for any fibers that enter a post, a portion of the fiber will also remain in the base. This ensures that the posts are integral to the base of the post-and-sheet layer. In the illustrative embodiment, the post-and-sheet layer is not monolithic; that is, the posts are not fully surrounded by resin. Rather, only the "bottom" of the post couples to the base. This helps keep the weight of the post-and-sheet layer relatively low.

The outer panels that sandwich the post-and-sheet layer typically, but not necessarily, comprise a thermoplastic, such as polyethylene. In some embodiments, the panels comprise composite material (i.e., thermoplastic and fiber). The fibers in the composite can be milled fibers (very short and non-aligned), long and non-aligned fibers, long and aligned fibers, or continuous aligned fibers.

Some embodiments provide an impact-absorbing article comprising a post-and-sheet layer including:
  (i) a base comprising fibers in a first polymer resin, the base having a first major surface and a second major surface, and
  (ii) a plurality of posts, wherein the posts extend from the first major surface of the base and are perpendicular thereto, and wherein at least some of the fibers in the base extend into respective ones of the posts, and wherein within each post, the fibers are aligned with a long axis of the post, the posts being characterized by a value for a slenderness ratio that results in micro-buckling when the posts are subjected to a compressive force;
  a first panel attached to the second major surface of the post-and-sheet layer, wherein the second panel is physically adapted to distribute an impact load received thereby to respective ones of the posts; and
  a second panel attached to a free end of each of the posts.

DETAILED DESCRIPTION

Figure 1A:
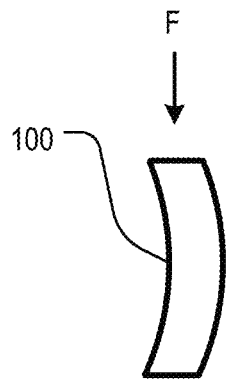
FIGS. 1A and 1B depict two known failure mechanisms of a column in compression.

Definitions. The following terms are defined for use in this description and the appended claims:

"Fiber" means an individual strand of material. A fiber has a length that is much greater than its diameter.

"Continuous fiber" references a fiber in the context of its environment. That is, a "continuous" fiber is a fiber that is substantially as long as its immediate environment/surroundings.

"Fiber bundle" means plural (typically multiples of one thousand) co-aligned fibers.

"Stiffness" in the context of a material means resistance to bending, as measured by Young's modulus. When used in the context of a spring or spring assembly, "stiffness" means resistance to displacement from an unstretched/uncompressed state.

"Tow" means a bundle of fibers (i.e., fiber bundle), and those terms are used interchangeably herein unless otherwise specified. Tows are typically available with fibers numbering in the thousands: a 1K tow (1000 fibers), 4K tow (4000 fibers), 8K tow, etc.

"Prepreg" means fibers that are impregnated with resin.

"Towpreg" means a fiber bundle (i.e., a tow) that is impregnated with resin.

"Preform" means a segment of plural, co-aligned, resin-impregnated, typically same-length fibers. The segment is cut to a specific length, and, in many cases, will be shaped (e.g., bent, twisted, etc.) to a specific form, as appropriate for the specific part being molded. Preforms are usually sourced from towpreg (i.e., the towpreg is sectioned to a desired length), but can also be from another source of plural co-aligned, unidirectionally aligned fibers (e.g., from a resin impregnation process, etc.). Preforms are preferably, but not necessarily, substantially circular or oval in cross section. Applicant's use of the term "preform" explicitly excludes: (i) tape, (ii) sheets of fiber, and (iii) laminates, cut to shape or otherwise. The modifier "fiber-bundle-based" or "aligned-fiber" may be pre-pended herein to the word "preform" to emphasize the nature of applicant's preforms and to distinguish them from prior-art preforms, which are typically in the form of tape, sheets, or shapes cut from sheets of fiber.

"Preform Charge" means an assemblage of preforms that are at least loosely bound together (i.e., tacked) so as to maintain their position relative to one another. Preform charges can contain fiber in form factors other than that of fiber bundles, and can contain various inserts, passive or active. Preform charges are not fully consolidated.

"Preform Layup" means an arrangement of individual preforms that is formed by placing preforms, one-by-one, into a mold cavity. A preform layup is distinguished from a preform charge, wherein for the latter, the preforms are at least loosely bound to one another and the assemblage thereof is usually formed outside of the mold cavity.

"Compatible" means, when used to refer to two different resin materials, that the two resins will mix and bond with one another.

"Compression molding" is a molding process that involves the application of heat and pressure to feed constituents for a period of time. The mold constituents are typically placed in a female mold portion having a mold cavity. After the requisite amount of feed constituents are placed in the female mold half, a second mold half—a male mold half—is joined to the female mold half to close the mold cavity. The male mold half usually includes features that extend into the female male half to engage the feed constituents therein. For applicant's processes, the applied pressure is usually in the range of about 500 psi to about 5000 psi, and temperature, which is a function of the particular resin being used, is typically in the range of about 150° C. to about 400° C. Once the applied heat has increased the temperature of the resin above its melt temperature, it is no longer solid and will flow. The resin will then conform to the mold geometry via the applied pressure, and the feed constituents are thereby consolidated, resulting in very little void space. Elevated pressure and temperature are typically maintained for a few minutes. After this compression molding protocol is complete, the mold is removed from the source of pressure and is cooled. Once cooled, a finished part is removed from the mold.

"Consolidate", "consolidating", or "consolidation" means, in the present context, that in a grouping of fibers/resin, such as plurality of preforms, void space is removed to the extent possible and as is acceptable for a final part. Feed structures lose any unique or individual identity and any previously existing boundaries between adjacent preforms are lost. This usually requires significantly elevated pressure, either through the use of gas pressurization (or vacuum), or the mechanical application of force (e.g., rollers, etc.), and elevated temperature (to soften/melt the resin).

"Partial consolidation" means, in the present context, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Neat" resin or other matrix material means the resin/matrix material includes no reinforcing fibers.

"About" or "Substantially" means +/−20% with respect to a stated figure or nominal value.

Additional definitions may be provided, in context, elsewhere in this specification. All patents and published patent applications referenced in this disclosure are incorporated by reference herein.

It is to be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. As a non-limiting example, a recited range of "1 to 10 µm" includes "5 to 8 µm", "1 to 4 µm", "2 to 9 µm", etc.

Embodiments of the invention provide an impact-absorbing article, such as for resistance against small-caliber projectiles. In accordance with the illustrative embodiment, the impact-absorbing article includes a first outer polymer panel and a second outer polymer panel that sandwich a fiber-composite post-and-sheet layer.

In the illustrative embodiment, the post-and-sheet layer includes a plurality of "posts" that extend orthogonally with respect to a sheet or "base." In the illustrative embodiment, both the posts and the base include fibers and a polymer resin. As a consequence of this orientation (i.e., posts orthogonal to the base), the impact received by one or more of the posts from an inbound projectile will be "end on." Due to such impact, the one or more posts will collapse, and it is desirable for the collapse to be due to "micro-buckling."

As is relevant here, there are two primary failure mechanisms for a post in end compression: micro-buckling and Euler buckling. For embodiments of the invention, the former mechanism is desirable, and the latter is undesirable. Euler buckling is a classic failure mechanism of a long slender column in compression. Micro-buckling is a common failure mechanism of an axially aligned fiber composite in compression. Both are well understood by those skilled in the art.

Figure 1B:
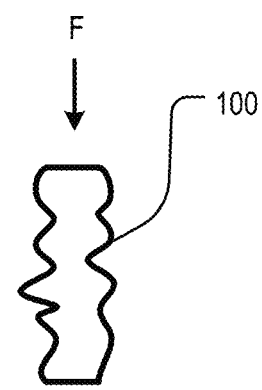

FIG. 1A depicts the bending characteristic of Euler buckling, and FIG. 1B depicts the transverse displacements characteristic of micro-buckling. The determination of failure mechanism is a function of post height and post diameter. Euler buckling will result if a post is "too" long and slender. By way of quantification, to determine if a column will fail in Euler buckling, it is common to use the "slenderness" ratio of a column, $l/k$, where $l$ is the length and $k$ is the radius of gyration, $k=\sqrt{I/A}$, where $I$ is the second moment of area and $A$ is the cross-sectional area of the column. The slenderness ratio is compared with Euler's curve to see if Euler buckling is likely. For embodiments of the invention, the slenderness ratio should be low enough to ensure micro-buckling is the failure mechanism. In conjunction with the present disclosure, it is within the capabilities of those skilled in the art to a design and fabricate posts that fail via micro-buckling in accordance with the present teachings.

An additional consideration as to the failure mechanism is the fiber volume fraction (FVF) within a post. At a sufficiently low FVF, the failure mechanism would be described as Euler buckling for a high slenderness ratio, and standard compressive failure for a low slenderness ratio. For embodiments of the invention, a practical lower limit to FVF in the posts is about 20% FVF. Higher FVF, which is desirable, results in more energy absorbed due to more fibers breaking due to micro-buckling.

Figure 2:
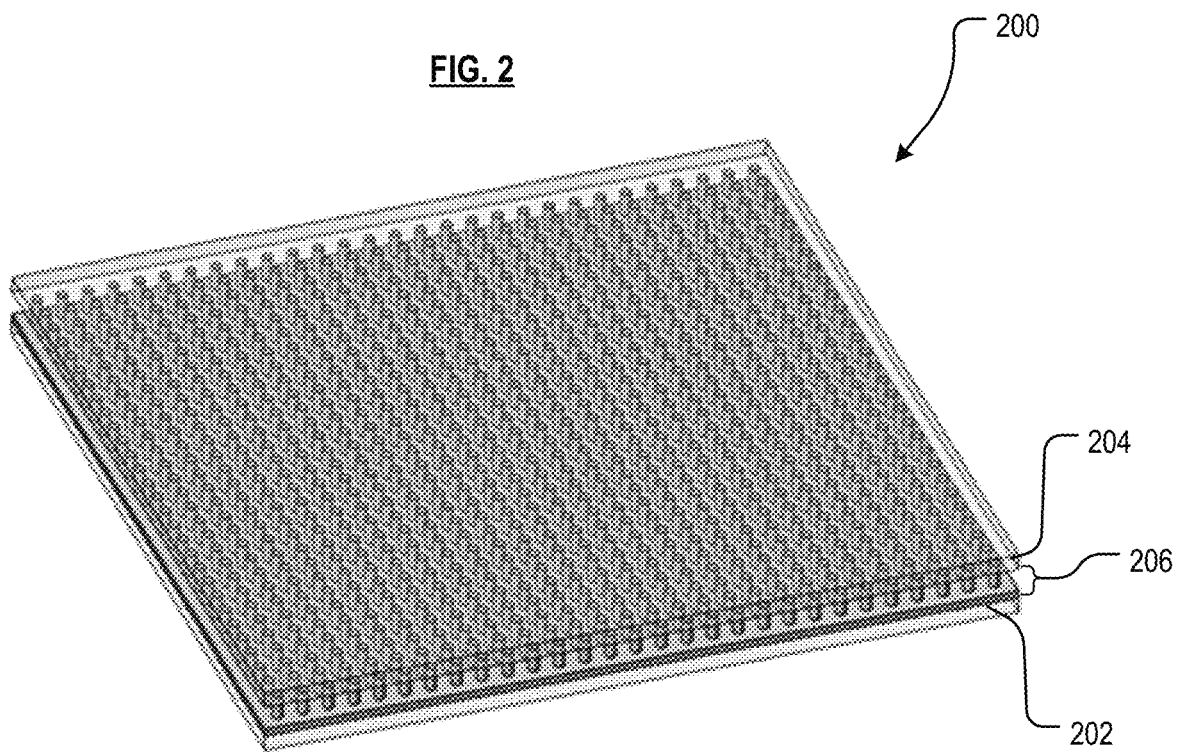
FIG. 2 depicts an impact-absorbing article in accordance with the illustrative embodiment.

FIG. 2 depicts impact-absorbing article 200 in accordance with the illustrative embodiment. The impact-absorbing article includes three parts: (i) a bottom or first outer panel 202, (ii) post-and-sheet layer 206, and (iii) a top or second outer panel 204. In the illustrative embodiment, article 200 is depicted as being flat and square/rectangular. However, in some other embodiments, article 200 is curved (non-linear), and may have another application-appropriate shape. Panels 202, 204, and post-and-sheet layer 206 are attached to one another, such as by an adhesive, ultrasonic welding, or other methods.

In some embodiments, outer panels 202 and 204 comprise a thermoplastic matrix material, such as polyethylene. The material(s) composing each panel 202 and 204 can be individually selected; that is, in some embodiments, the two panels may be different from one another. In some embodiments, panels comprise composite material; in other words, polymer as well as fibers. The fibers can be milled fiber (very short and non-aligned), long and non-aligned fibers, long and aligned fibers, or continuous aligned fibers. In some embodiments, outer panels 202 and 204 can comprise a weave of natural or synthetic fiber. In yet some further embodiments, outer panels 202 and 204 comprise materials other than composites, such as ceramics or other materials.

Figure 3:
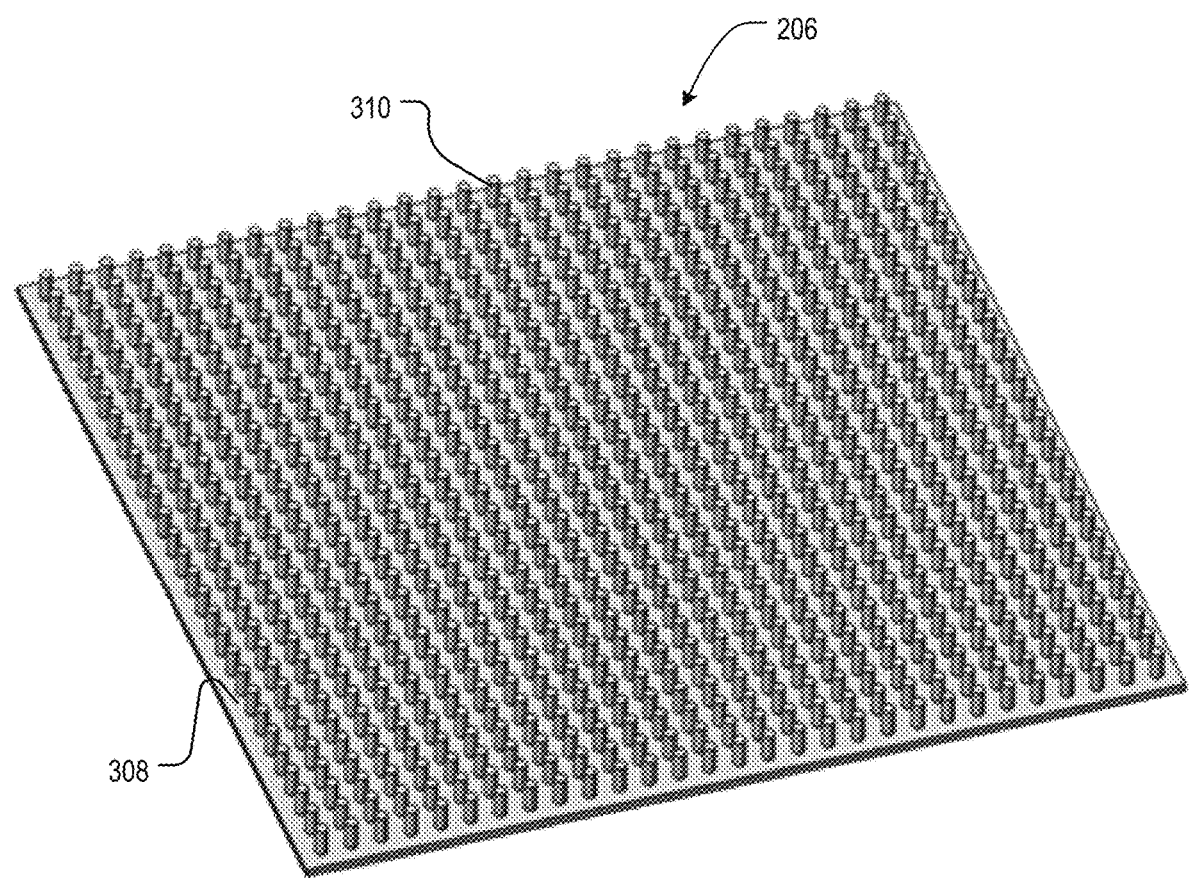
FIG. 3 depicts a post-and-sheet layer of the impact-absorbing article of FIG. 2.

As depicted in FIG. 3 post-and-sheet layer 206 includes base 308 and a plurality of posts 310 extending orthogonally therefrom. In the embodiment depicted in FIG. 3, both base 308 and posts 310 comprise fibers in a thermoplastic resin.

The spacing of posts 310 in post-and-sheet layer 206 is a tradeoff between weight and energy absorption. If the buckling force of posts 310 is too high (e.g., because they are very densely packed, and/or because they "too" thick, etc.), buckling does not occur or minimally occurs. The force of a projectile would then be transferred directly between outer panels 204 and 202 and the energy is transferred (such as into a person) rather than being absorbed. Spacing of posts 310 is also dependent on projectile size. That is, posts 310 should be spaced closely enough together that a projectile will always be directed toward at least one post. (Note: the projectile will actually impact the overlying panel—typically panel 202—rather than the post.) Panel 202 helps distribute the impact load to as many posts 310 as possible. This results in an impact "zone," which is substantially larger than the size of the projectile. It is desirable for panel 202 to be sufficiently thick and stiff to facilitate energy transfer from the impact zone to as many posts as possible. In addition to any contribution to distributing the impact load to the posts, panel 204 helps distribute the (remaining) impact load to a relatively larger area of a wearer's torso.

In some embodiments, base 308 of post-and-sheet layer 206 includes a plurality of continuous fibers and a plurality of "long" fibers. In some other embodiments, base 308 includes only plural long fibers. Continuous fibers are substantially as long as a side of base 308, and "long" fibers are defined as fibers that are about twice as long as posts 310.

Figure 4A:
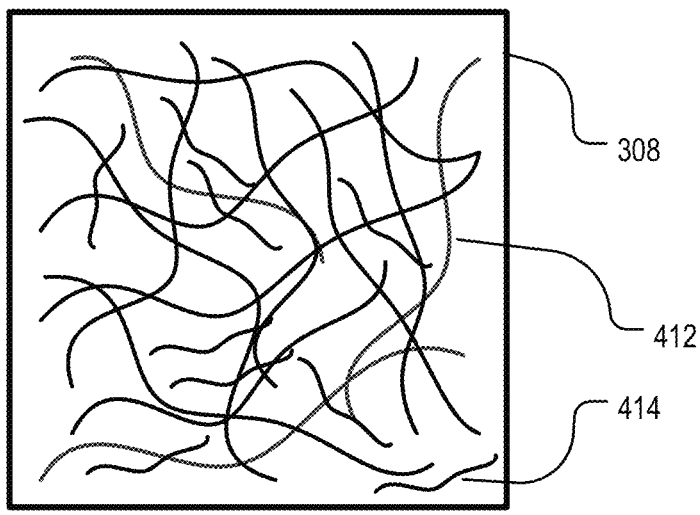
FIG. 4A depicts an exemplary fiber alignment in the base of the post-and-sheet layer of FIG. 3.

FIG. 4A depicts a plurality of continuous fibers 412 and long fibers 414. Whether continuous and long fibers, or long fibers only, the fiber orientation within base 308 is preferably random within the thermoplastic resin matrix. A random fiber orientation is preferable in the base because this imbues the base with transverse isotropic properties, which are appropriate for a non-directional application like a ballistics panel. This results in relatively greater energy absorption. The random fiber orientation also provides base 308 with relatively higher toughness, and therefore greater energy absorption.

Figure 4B:
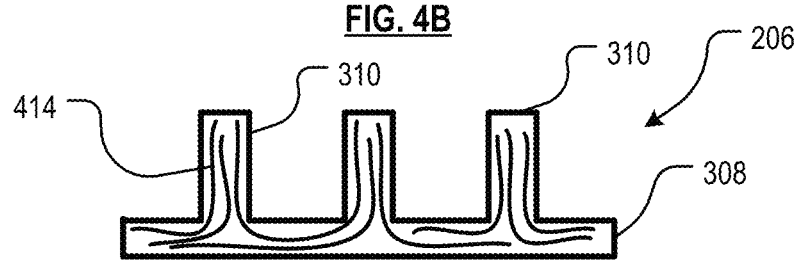
FIG. 4B depicts an exemplary fiber alignment in the posts of the post-and-sheet layer of FIG. 3.

FIG. 4B depicts, via a cross-sectional view, fiber alignment in post-and-sheet-layer 206. It is notable that some long fibers 414 within base 308 extend into posts 310. Such fibers are aligned axially within the posts (i.e., aligned with the long axis of the post). The axially aligned fibers in posts 310 render posts 310 prone to failure by micro-buckling, which, as previously discussed, is the preferred failure mode for the posts to maximize energy absorption.

Since the fibers are longer than the posts, for any fibers 412 or 414 that enter posts 310, a portion of each of such fibers will also remain in base 308. This ensures that posts 310 are integral to base 308. In the illustrative embodiment, post-and-sheet layer 206 is not monolithic; that is, posts 310 are not fully surrounded by resin (only the "bottom" of post 310 couples to base 308). This helps keep the weight of the impact-absorbing article relatively low.

Posts 310 are depicted as being cylindrical, but they can also be tapered to help with (molding) tool release during the molding process, and to aid in controlling buckling progression. In other words, if post 310 is tapered, it would start buckling at the small diameter end and progress to the large-diameter end as more force is absorbed. If tapered, the larger-diameter end of post 310 would be the end proximal to base 308. Moreover, posts can have a non-circular cross section, such as, without limitation, a polygonal cross section.

Figure 5:
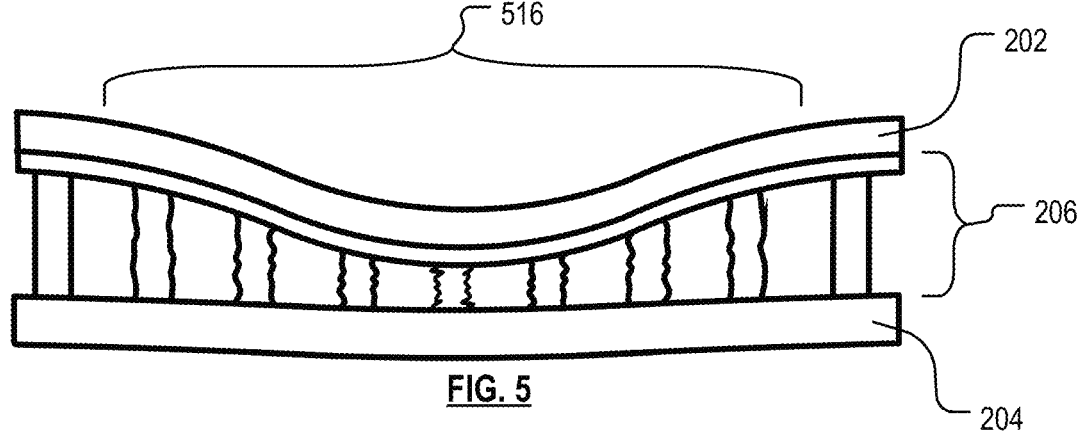
FIG. 5 depicts, via cross-sectional view portion, a portion of the post-and-sheet layer deforming due to a ballistics impact.

FIG. 5 depicts a portion of an embodiment of the impact-absorbing article deforming due to a ballistics impact, defining impact zone 516 after the impact. In the embodiment depicted in FIG. 5, impact of a round (not depicted) occurs with panel 202, which abuts base 308 of post-and-sheet layer 206. The impact zone is distributed radially around the center of impact and spread out by the stiffness of panel 202 and the stiffness of post-and-sheet layer 206. Posts 310 within this impact zone experience varying degrees of micro-buckling, wherein those in the center of impact experience relatively more than those toward the periphery of the impact zone. Bottom panel 204 suffers some deformation, as a function of the impact energy, but the majority of the energy is absorbed by the posts. Micro-buckling of the posts is not reversible.

As previously noted, post-and-sheet layer 206 is not monolithic, and as a result, the overall panel is significantly lighter than existing solutions. In some embodiments, panels 202 and 204 have a thickness of 1.6 mm, base 308 of post-and-sheet layer 206 has a thickness of 0.8 mm, and posts 310 have a height of 2.4 mm, a diameter of 1 mm, and are spaced apart by 2.5 mm. The impact-absorbing article therefore has an areal weight of 0.91 lb/ft$^2$ (4.4 kg/m$^2$). If post-and-sheet layer 206 were monolithic, the areal weight of the impact-absorbing article would be 1.52 lb/ft$^2$ (7.4 kg/m$^2$). A weight savings of 40 percent is thus realized.

Materials of Construction. The thermoplastic resin used to form the matrix of post-and-sheet layer 206 can be any thermoplastic material, including, without limitation acrylonitrile butadiene styrene (ABS), ethylene tetrafluoroethylene (ETFE), fluorinated ethylene propylene (FEP), liquid crystal polymers (LCPs), polyamides (Nylon), polyaryletherketones (PAEK), polybenzimidazole (PBI), polybutylene terephthalate (PBT), polycarbonates (PC), and polycarbonate-ABS (PC-ABS), polyethylene (PE), polyetheretherketone (PEEK), polyetherimide (PEI), polyether sulfones (PES), polyethylene terephthalate (PET), perfluoroalkoxy copolymer (PFA), polyimide (PI), polymethylmethacrylate (PMMA), polyoxymethylene (polyacetals) (POM), polypropylene (PP), polyphosphoric acid (PPA), polyphenylene ether (PPE), polyphenylene oxide (PPO), polyphenylene sulfide (PPS), polyphenylsulfone (PPSU), Polystyrene (PS), polysulfone (PSU), polytetrafluoroethylene (PTFE), polyurethane (PU), polyvinyl chloride (PVC), styrene acrylonitrile (SAN), and styrene butadiene styrene (SBS). A thermoplastic can be a thermoplastic elastomer such as polyurethane elastomer, polyether ester block copolymer, styrenic block copolymer, polyolefin elastomer, polyether block amide, thermoplastic olefins, elastomeric alloys (TPE and TPV), thermoplastic polyurethanes, thermoplastic copolyesters, thermoplastic polyamides, and thermoplastic silicone vulcanizate.

In embodiments in which panels 202 and 204 comprise thermoplastic polymer, any of the aforementioned thermoplastic polymers can be used for that purpose as well.

Suitable fibers include, but are not limited to, carbon, glass, aramid, or HPPE. Fibers having a small diameter, typically less than 0.001 inches, are preferred for use.

Embodiments of the impact-absorbing article described herein can be produced via a compression-molding process. Preforms having an appropriate size and composition are placed in a mold cavity suitable for forming post-and-sheet layer 206.

It is to be understood that the disclosure describes a few embodiments and that many variations of the invention can easily be devised by those skilled in the art after reading this disclosure and that the scope of the present invention is to be determined by the following claims.

What is claimed:

1. An impact-absorbing article comprising:
    a post-and-sheet layer including:
        (iii) a base comprising fibers in a first polymer resin, the base having a first major surface and a second major surface, and
        (iv) a plurality of posts, wherein the posts extend from the first major surface of the base and are perpendicular thereto, and wherein at least some of the fibers in the base extend into respective ones of the posts, and wherein within each post, the fibers are aligned with a long axis of the post, the posts being characterized by a value for a slenderness ratio that results in micro-buckling when the posts are subjected to a compressive force;
    a first panel attached to the second major surface of the post-and-sheet layer, wherein the second panel is physically adapted to distribute an impact load received thereby to respective ones of the posts; and
    a second panel attached to a free end of each of the posts.

2. The impact-absorbing article of claim 1 wherein the fibers in the base are randomly oriented in the first polymer resin.

3. The impact-absorbing article of claim 1 wherein the fibers in the base comprise fibers that are at least twice as long as a length of the posts.

4. The impact-absorbing article of claim 1 wherein the second panel comprises a second polymer resin.

5. The impact-absorbing article of claim 4 wherein the second panel comprises fibers dispersed within the second polymer resin.

6. The impact-absorbing article of claim 4 wherein the second polymer resin is polyethylene.

7. The impact-absorbing article of claim 1 wherein the first panel comprises a third polymer resin.

8. The impact-absorbing article of claim 7 wherein the first panel comprises fibers dispersed within the third polymer resin.

9. The impact-absorbing article of claim 8 wherein the third polymer resin is polyethylene.

10. The impact-absorbing article of claim 1 wherein the fibers in the base are selected from the group consisting of carbon, glass, aramid, or HPPE.

11. An impact-absorbing article comprising:
    a post-and-sheet layer including:
        (i) a base comprising a first polymer resin, the base having a first major surface and a second major surface, and
        (ii) a plurality of posts, wherein the posts extend from the first major surface of the base and are perpendicular thereto, the posts have at least at least one physical adaptation that promotes micro-buckling when the posts are subjected to a compressive force;
    a first panel attached to the second major surface of the post-and-sheet layer, wherein the second panel is physically adapted to distribute an impact load received thereby to respective ones of the posts; and
    a second panel attached to a free end of each of the posts.

12. The impact-absorbing article of claim 11 wherein the at least one physical adaptation is a first plurality of fibers disposed within the posts, wherein the first plurality of fibers disposed in the posts are substantially aligned with a long axis of the posts.

13. The impact-absorbing article of claim 12 wherein the first plurality of fibers are at least as long as the posts.

14. The impact-absorbing article of claim 13 wherein the first plurality of fibers in the posts extend into the base of the post-and-sheet layer.

15. The impact-absorbing article of claim 14 further comprising a second plurality of fibers, wherein the second plurality of fibers are randomly oriented in the first polymer resin in the base.

16. The impact-absorbing article of claim 15 wherein the first plurality of fibers and the second plurality of fibers are selected from the group consisting of carbon, glass, aramid, or HPPE.

17. The impact-absorbing article of claim 13 wherein the fibers in the posts extend at least as far beyond the posts into the base, as the fibers extend into the posts.

18. The impact-absorbing article of claim 12 and further wherein the posts are characterized, by virtue of dimensions thereof, by a value for a slenderness ratio that results in micro-buckling when the posts are subjected to a compressive force.

19. The impact-absorbing article of claim 11 wherein the at least one physical adaptation is that the posts are characterized, by virtue of dimensions thereof, by a value for a slenderness ratio that results in micro-buckling when the posts are subjected to a compressive force.

* * * * *